(12) United States Patent
Murthy et al.

(10) Patent No.: US 9,969,884 B2
(45) Date of Patent: May 15, 2018

(54) DISPERSION POWDER IN ASPHALT

(71) Applicant: WACKER CHEMICAL CORPORATION, Adrian, MI (US)

(72) Inventors: Ranjini Murthy, Easton, PA (US); Elvira Joana Ferreira Peralta, Allentown, PA (US); Corrin Pimentel, Allentown, PA (US)

(73) Assignee: WACKER CHEMIE AG, Munich (DE)

( * ) Notice: Subject to any disclaimer, the term of this patent is extended or adjusted under 35 U.S.C. 154(b) by 0 days. days.

(21) Appl. No.: 14/709,847

(22) Filed: May 12, 2015

(65) Prior Publication Data
US 2016/0333183 A1   Nov. 17, 2016

(51) Int. Cl.
| *C08L 95/00* | (2006.01) |
| *C08L 31/04* | (2006.01) |
| *C08L 53/02* | (2006.01) |

(52) U.S. Cl.
CPC ............ *C08L 95/00* (2013.01); *C08L 31/04* (2013.01); *C08L 53/02* (2013.01); *C08L 95/005* (2013.01); *C08L 2555/80* (2013.01)

(58) Field of Classification Search
CPC ................................ C08F 45/52; C08L 95/00
USPC .......................................... 260/28.5; 524/68
See application file for complete search history.

(56) References Cited

U.S. PATENT DOCUMENTS

| 4,073,759 A | 2/1978 | Lowry et al. |
| 2009/0092846 A1* | 4/2009 | Takamura ............. C04B 41/009 428/480 |
| 2009/0148712 A1 | 6/2009 | Xiao |
| 2011/0230598 A1* | 9/2011 | Sorger .................. E01C 11/226 524/5 |
| 2013/0184389 A1 | 7/2013 | Hakata |

FOREIGN PATENT DOCUMENTS

| CN | 101824176 A | 9/2010 |
| EP | 337282 | * 10/1989 |
| EP | 0337282 A1 | 10/1989 |
| GB | 1 348 864 | 3/1974 |
| JP | 2002364297 A | 12/2002 |
| KR | 101239399 B1 | 3/2013 |
| WO | 97/44397 A1 | 11/1997 |
| WO | WO 2009/017262 | * 2/2009 |
| WO | 2010067888 A1 | 6/2010 |
| WO | 2011112569 A2 | 9/2011 |

OTHER PUBLICATIONS

J. Schulze, "Redispersionspulver im Zement", Sonderdruck aus TIZ, vol. No. 9, 1985, Wacker Chemie GmbH, pp. 3-14.
PCT International Search Report and Written Opinion dated Jul. 26, 2016, Application No. PCT/US2016/031770, (12 pages).

* cited by examiner

*Primary Examiner* — Deve E Valdez
(74) *Attorney, Agent, or Firm* — Brooks Kushman P.C.

(57) ABSTRACT

The subject of the invention is a polymer-modified asphalt composition obtained by blending asphalt with a vinyl acetate/ethylene polymer, and optionally with further additives, and a process for the preparation of the polymer-modified asphalt composition, and the use of the polymer-modified asphalt composition.

13 Claims, No Drawings

DISPERSION POWDER IN ASPHALT

BACKGROUND OF THE INVENTION

1. Field of the Invention

The invention relates to a polymer modified non-aqueous asphalt composition, a process for the preparation of the polymer modified asphalt composition, and the use of the polymer modified asphalt composition.

2. Description of the Related Art

Asphalt or bitumen (called "asphalt" herein), are terms used to describe the residue left over from the petrochemical refining process. Asphalt is used in a variety of applications, for uses such as, but not limited to, paving, sealing, coating, roofing, waterproofing, and draining, and as weather barriers.

Asphalt without polymer modification is typically soft at room temperature, and tends to be brittle at lower temperatures, therefore lacking properties for use on its own in some of the applications mentioned above. A general strategy is to modify the asphalt with a variety of property enhancing polymers and/or additives.

Polymer modification, depending on the application, is generally intended to provide many benefits, such as, but not limited to, improved viscosity, softening point, ductility, resiliency, tack, flow or creep resistance, adhesion, flexibility, and low and high temperature performance. Most polymer modifications of asphalt in non-aqueous systems are accomplished with styrene butadiene styrene (SBS), styrene butadiene rubber (SBR), styrene ethylene butylene styrene (SEBS), styrene isoprene butadiene styrene (SIBS), styrene isoprene styrene (SIS), called "S-polymers," herein, and ground tire rubber (GTR) containing the S-polymers mentioned above.

To further enhance the properties of asphalt, a variety of additives have been used. Such additives, include, but are not limited to, extender oils, naphthalenic oils, paraffinic oils, acids such as phosphoric acid, polyphosphoric acid, plastomers, tackifiers, waxes, stabilizers, emulsifiers, rosin esters, fillers and combinations thereof.

During the processing of asphalt, there is a need for processing temperatures well above the melt point of asphalt. Furthermore, the incorporation of certain types of polymers, for example the S-polymers, requires long mixing times for complete and thorough incorporation and homogenization into the non-aqueous asphalt system. The incorporation and homogenization of the S-polymers requires the asphalt-polymer system to be heated to temperatures above the softening point of the S-polymers. Still further, along with the high temperatures, there is a need for high mixing and shear of the system to ensure complete suspension of the S-polymers in the asphalt phase. This processing tends to be tedious and often time consuming, with long cycle times, and may also require long cooling periods for further processing.

Even still further, the S-polymers tend to increase viscosity, reduce tack, and cause excessive heat generation in the mix vessel. Therefore, additives such as extenders, paraffinic and naphthalenic oils, plastomers, waxes, and tackifiers are added to address the challenges of combining these polymers with a non-aqueous asphalt system. S-polymers may be supplied in a variety of forms, for example, but not limited to, blocks, bales, chips, pellets, gratings, liquids, etc., or combinations thereof. Therefore, preliminary processing of some of the forms of the S-polymers is essential. For example, polymer blocks or bales require processing such as crushing, milling, grating, etc., to enable the processes of blending and homogenizing the S-polymers with asphalt to be possible.

EP 0 337 282 B1 describes bituminous materials particularly for the preparation of films, sheets, and roofing membranes, comprising bitumen, polystyrene polybutadiene block ("SBS") copolymer, and a solid resin of an ethylene/vinyl acetate ("EVA") copolymer with 40 to 50% by weight of vinyl acetate units. The ratio of SBS copolymer to EVA copolymer is stated to be critical, and must be in the range of 2:1 to 6:1 by weight.

WO 97/44397 A1 discloses bitumen compositions for the use in road applications which comprise a bitumen component and a thermoplastic rubber such as a polystyrene polybutadiene block copolymer, and a solid resin of an ethylene/vinyl acetate (EVA) copolymer with 25 to 35% by weight of vinyl acetate units in the copolymer. With the addition of an ethylene/vinyl acetate copolymer, higher hardness and better solvent resistance is obtained.

WO 2011/112569 A2 teaches the preparation of hot mix asphalt (HMA) which is used as a paving composition. For the production of HMA, aggregate is incorporated into asphalt. In combination with the aggregate, a polymer modified binder (PMB) is added to the asphalt. The PMB is composed of a thermoplastic material (SBS), oil and filler, and it is added in a powder, pellet, chip, flake or granule form.

U.S. 2013/0184389 A1 concerns compositions for pavement with improved resistance against deformation in the summer season and occurrence of cracks in the winter season. The composition comprises petroleum-based process oils, a block copolymer based on polystyrene blocks in combination with polybutadiene blocks or polyisoprene blocks, and a solid resin of an ethylene/vinyl acetate copolymer with a vinyl acetate content of 25 to 45% by weight. For copolymers with more than 45% vinyl acetate, it is reported that there is deterioration of surface properties.

U.S. Pat. No. 4,073,759 describes an aqueous asphalt composition for the protection of metals against corrosion. The composition is obtained by admixing asphalt with SBR rubber latex, polyacrylate dispersion, and a polyamine surface active agent.

It would be desirable to provide asphalt compositions based on non-aqueous asphalt which provide good low and high temperature performance and adhesiveness to substrates, and at the same time, provide for more economic processing.

SUMMARY OF INVENTION

It has now been surprisingly and unexpectedly discovered that non-aqueous asphalt compositions having the improved properties described above can be formulated, while avoiding the drawbacks of prior art compositions, by incorporating into the asphalt, a vinyl acetate/ethylene ("VAE") copolymer containing more than 50 weight percent vinyl acetate-derived moieties. The processing of the inventive compositions is less complicated and more rapid, and the compositions exhibit reduced melt viscosity, yet can develop superior adhesion properties.

DETAILED DESCRIPTION OF THE PREFERRED EMBODIMENTS

Thus, the invention relates to the use of a vinyl acetate/ethylene polymer powder having a vinyl acetate content of more than 50% by weight as a polymer modifier for an asphalt system, alone or in conjunction with other polymer modifiers.

Further, this invention relates to a polymer powder used as a modifier for asphalt systems, wherein the polymer is a free flowing powder, which, when mixed with asphalt, results in easier processing, mixing, lower cycle and shear rates and times, without compromising any properties such as viscosity, softening point, resiliency, adhesion, ductility, low temperature flexibility and high temperature performance, that may be critical to any of the applications discussed above.

The use of styrene copolymers (S-polymers) for the modification of asphalt compositions has the disadvantage that S-polymers are solid resins often delivered in form of blocks which have to be crushed and milled before blending with asphalt. A further drawback of asphalt modification with S-polymers is the need of high processing temperature of up to 200° C. Due to the high processing temperature and the high viscosity of the admixture of asphalt and S-polymer the cooling time is undesirably long, which results in a long cycle time for blending.

Taking this background into account, the problem to be solved by the present invention was the improvement of polymer modification of asphalt which results in lower cycle times without reduction of the quality of the polymer modified asphalt regarding viscosity, softening point, low temperature flexibility and high temperature performance.

The subject of the invention is a polymer modified asphalt composition obtained by blending asphalt with a vinyl acetate/ethylene polymer powder having a vinyl acetate content of more than 50% by weight based on the weight of the polymer constituents of the polymer powder, and optionally further additives.

Suitable kinds of asphalt for use in the present invention are those commonly used in any of the applications listed above, such as, but not limited to, asphalt reflected by the three systems typically used to grade asphalt: penetration grading system (ASTM D D946/D946M-09a) ("penetration grade"), viscosity grading system (ASTM D3381-09) ("viscosity grade") and the commonly used system in the U.S., the performance grading system (ASTM D6373-15) ("performance grade").

To be considered a penetration grade, asphalt is prepared by the refining of crude petroleum by suitable methods. The asphalt is homogeneous, and does not foam when heated to 175° C. or 350° F. The various penetration grades of asphalt are indicated in Table 1 below. The requirements for grading are defined based on several tests, such as needle penetration at 25° C. or 77° F. (ASTM D140), softening point (ASTM D36), flash point (ASTM D92), ductility at 25° C. or 77° F. (ASTM D113), solubility in trichloroethylene (ASTM D2042), retained needle penetration after rolling thin-film oven test (ASTM D1754), and ductility after rolling thin-film oven test (ASTM D113).

TABLE 1

Penetration Grade Asphalt Binder ASTM D946/D946M-09a

| Penetration Grade | Min. Value | Max. Value |
| --- | --- | --- |
| 40-50 | 40 | 50 |
| 60-70 | 60 | 70 |
| 85-100 | 85 | 100 |
| 120-150 | 120 | 150 |
| 200-300 | 200 | 300 |

The viscosity grading system is similar to the penetration grading system. To be considered a viscosity grade, asphalt is prepared by the refining of crude petroleum by suitable methods. The asphalt is homogeneous, and does not foam when heated to 175° C. or 350° F. The various viscosity grades of asphalt cement are AC-2.5, AC-5, AC-10, AC-20, AC-30 and AC-40. The requirements for grading are defined based on several tests, such as, asphalt viscosity at 60° C. or 140° F. (ASTM D2171) and 135° C. or 275° F. (ASTM D2170), needle penetration at 25° C. or 77° F. (ASTM D140), flash point (ASTM D92), ductility at 25° C. or 77° F. (ASTM D113), solubility in trichloroethylene (ASTM D2042), retained needle penetration after rolling thin-film oven test (ASTM D1754), and ductility after rolling thin-film oven test (ASTM D113).

The performance grading system is applied to asphalt binders, which are defined as asphalt based cements that are produced by petroleum residue either with or without the addition of modifiers. The asphalt cement should conform to the requirements indicated in Table 2. These requirements are defined based on several tests: flash point (ASTM D92), viscosity at 135° C. or 275° F. (ASTM D4402), dynamic shear (ASTM D7175), rolling thin-film oven (ASTM D2872), pressure aging vessel (ASTM D6521), flexural creep stiffness (ASTM D6648), and direct tension (ASTM D6723).

TABLE 2

Performance Graded Asphalt Binder Specification ASTM D6373-15
PERFORMANCE GRADED ASPHALT BINDER
SPECIFICATION ASTM D6373-15

| PG 46 | −34 −40 −46 |
| --- | --- |
| PG 52 | −10 −16 −22 −28 −34 −40 −46 |
| PG 58 | −16 −22 −28 −34 −40 |
| PG 64 | −10 −16 −22 −28 −34 −40 |
| PG 70 | −10 −16 −22 −28 −34 −40 |
| PG 76 | −10 −16 −22 −28 −34 |
| PG 82 | −10 −16 −22 −28 −34 |

The asphalt used in the present invention also includes, but is not limited to, natural products such as lake asphalt, gilsonite, and natural rock asphalt. Further, it includes crude petroleum residues, such as, but not limited to, paraffin base, mixed base, and asphalt base. The asphalt base further includes, for example, asphalt cements, oxidized asphalts and liquid asphalts, which further includes cutbacks and road oils and emulsions, or any of the above combinations thereof. Still further, the bituminous materials used in the present invention include, tars, for example, from a coal destructive distillation and cracking of petroleum vapors or any combinations thereof.

By the term "non-aqueous asphalt" is meant that the asphalt used in preparing the inventive composition is used in substantially non-aqueous form. The resulting product, especially after the high temperature blending is also substantially non-aqueous, and is preferably used in this form. However, following the blending operation, the non-aqueous polymer-modified composition can be emulsified to form an aqueous polymer-modified asphalt emulsion.

Polymer powders used in this invention are preferably water-dispersible polymer powders. Water-dispersible polymer powders are generally obtained by drying the corresponding aqueous polymer dispersions in the presence of a drying aid (generally a protective colloid) and an antiblocking agent. The protective colloid serves as an encasing for the polymer and functions to prevent irreversible aggregation or coalescence of the polymer particles during the course of the drying operation. The protective colloid redissolves when the polymer powder is dispersed in water, and it has the effect that the polymer particles are again present in the aqueous redispersion with the particle size of the starting dispersion. (TIZ-Fachberichte, 1985, Vol. 109 (9), 698).

The polymer powders are based, in general, on vinyl acetate/ethylene (VAE) copolymers having a vinyl acetate content of more than 50% by weight, preferably ≥52% by weight, more preferably ≥55% by weight, and an ethylene content of less than 50% by weight, preferably 1 to 40% by weight, and optionally further monomers copolymerizable therewith, in each case based on the total weight of the monomer mixture, and the figures in % by weight totaling 100% by weight in each case.

Suitable further vinyl ester monomers are vinyl higher esters, for example those of carboxylic acids having 3 to 15 C atoms. Suitable further monomers from the group of acrylic esters or methacrylic esters include, for example, esters of unbranched or branched alcohols having 1 to 15 C atoms. Preferred vinylaromatic further monomers are styrene, methylstyrene, and vinyltoluene. A preferred vinyl halide further monomer is vinyl chloride. The preferred olefin further monomers are propylene and butylene, and the preferred dienes are 1,3-butadiene and isoprene.

Optionally, it is also possible for 0.1 to 10% by weight of auxiliary monomers to be copolymerized, based on the total weight of the monomer mixture. Preference is given to using 0.1 to 5% by weight of optional auxiliary monomers. Examples of optional auxiliary monomers are ethylenically unsaturated monocarboxylic and dicarboxylic acids, ethylenically unsaturated carboxamides and carbonitriles, and also maleic anhydride, and ethylenically unsaturated sulfonic acids and their salts. Other examples of optional auxiliary monomers are precrosslinking comonomers such as polyethylenically unsaturated comonomers, or post crosslinking comonomers, examples being N-methylolacrylamide (NMA), and N-methylolmethacrylamide (NMMA). Also suitable are epoxide-functional comonomers such as glycidyl methacrylate and silicon-functional comonomers, such methacryloyloxypropyltrialkoxysilanes, and vinyltrialkoxysilanes.

Preference is given to copolymers of 60 to 99% by weight of vinyl acetate with 1 to 40% by weight of ethylene;

Copolymers of more than 50% by weight of vinyl acetate with 1 to 40% by weight of ethylene and one or more further comonomers from the group of the vinyl esters having 1 to 12 carbon atoms in the carboxyl radical, such as vinyl propionate, vinyl laurate, and vinyl esters of alpha-branched carboxylic acids having 5 to 12 carbon atoms, such as VeoVa9® and VeoVa10®;

Copolymers of more than 50% by weight of vinyl acetate, 1 to 40% by weight of ethylene and one or more further comonomers from the group of (meth)acrylic esters of unbranched or branched alcohols having 1 to 15 carbon atoms, especially methyl methacrylate, methyl acrylate, n-butyl acrylate and 2-ethylhexyl acrylate; where the copolymers may each also contain the auxiliary monomers mentioned in the amounts mentioned, and the figures in % by weight total 100% by weight in each case.

The monomer selection and the selection of the weight fractions of the comonomers are preferably selected so as to result in glass transition temperatures, $T_g$, ranging from –20° C. to +40° C., more preferably –20° C. to +30° C., and most preferably –10° C. to +20° C. The $T_g$ of the polymers can be determined in a known way by means of Differential Scanning calorimetry (DSC, DIN EN ISO 11357-1/2), for example determined with a calorimeter DSC from Mettler-Toledo, with a heating rate of 10 K/min as midpoint temperature. The $T_g$ may also be calculated approximately in advance using the Fox equation. According to Fox T. G., Bull. Am. Physics Soc. 1, 3, page 123 (1956) the following is the case: $1/T_g = x_1/T_{g1} + x_2/T_{g2} + \ldots + x_n/T_{gn}$, where $x_n$ stands for the mass fraction (wt %/100) of the monomer n, and $T_{gn}$ is the glass transition temperature, in degrees Kelvin, of the homopolymer of the monomer n. $T_g$ values for homopolymers are listed in Polymer Handbook 2nd Edition, J. Wiley & Sons, New York (1975).

The polymers are prepared generally in an aqueous medium and preferably by the emulsion or suspension polymerization process, as described for example in WO 2010/057888 A1. The polymers in that case are obtained in the form of aqueous dispersions. In the polymerization, it is possible to use the customary protective colloids and/or emulsifiers, as described in WO 2010/057888 A1.

As protective colloids preference is given to partially hydrolyzed or fully hydrolyzed polyvinyl alcohols, having a degree of hydrolysis of 80 to 100 mol-%, more particularly to partially hydrolyzed polyvinyl alcohols having a degree of hydrolysis of 80 to 94 mol-% and a Höppler viscosity, in 4% strength aqueous solution, of 1 to 30 mPas (Höppler method at 20° C., DIN 53015). The stated protective colloids can be obtained by methods known to the skilled person, and are added generally in an amount of in total 1 to 20% by weight, based on the total weight of the monomers, in the polymerization.

The polymers in the form of aqueous dispersions will be dried in a conventional manner. In a preferred embodiment the polymers may be converted to water-dispersible polymer powders by the spray-drying process, as described in WO 2010/057888 A1, for example. In that case it is usual to add a drying aid in a total amount of 3 to 30% by weight, based on the polymeric constituents of the dispersion. Preferred drying aids are the abovementioned polyvinyl alcohols. Additionally, antiblocking agent may be added during or after the drying step.

The polymer powders are commercially available, for example as Vinnapas® and ETONIS® dispersion powders of Wacker Chemie AG.

The vinyl acetate/ethylene polymers may also be prepared by other methods, including solution polymerization, or bulk (neat) polymerization. Polymers prepared by solution or bulk polymerization are preferably supplied in a form having a relatively high surface area. For this purpose, for example, the polymers may be extruded into pellets or granules by conventional processes or otherwise prepared in small particle sizes. The use of water-dispersible powders resulting from emulsion or suspension polymerization followed by drying, in particular, spray drying, reduces asphalt blending time significantly, and thus water dispersible powders are highly preferred.

While the composition of the polymer modified asphalt composition depends on the end-use application and the required properties, it generally comprises 60 to 99% by weight, preferably 70 to 98% by weight of the asphalt component, and more preferably 80 to 95% by weight of asphalt component, in each case based on the total weight of the polymer-modified asphalt composition.

In general the polymer-modified asphalt composition is obtained by the addition of 1 to 40% by weight, preferably 2 to 30% by weight, and more preferably 4 to 20% by weight of polymer powder, in each case based on the total weight of the polymer-modified asphalt composition.

The amount of polymer powder depends on both the application as well as whether 5-polymers, or other modifiers and additives are used in polymer modification or not. In a preferred embodiment, 0 to 10% by weight of the polymer added for polymer-modification, based on the total weight of the polymer-modified asphalt composition, is one or more styrene polymers (S-polymers) from the group comprising styrene butadiene styrene (SBS), styrene butadiene rubber (SBR), styrene ethylene butylene styrene (SEBS), styrene isoprene butadiene styrene (SIBS), styrene isoprene styrene (SIS), and ground tire rubber (GTR). In preferred embodiments, the weight ratio of 5-polymer to VAE copolymer is less than 2:1, preferably less than 1.5:1.

The total amount of polymers of all types added to the non-aqueous asphalt is preferably in the range of 1 to 40 weight percent, based on the total weight of the polymer modified asphalt, preferably 1 to 30 weight percent, more preferably 1.5 to 15 weight percent, and most preferably 2 to 15 weight percent. Amounts of 5 to 10 weight percent have proven to be particularly useful.

The selection of other additives and the proportion thereof is state of the art and is well-known to the skilled worker. These additives, include, but not limited to, hydrocarbon resins, pitch pine, rosin esters, extender oils, naphthalenic or paraffinic oils, acids such as phosphoric or polyphosphoric acid, polyamines, stabilizers, solvents, waxes, etc., or combinations thereof.

Further, additives which may be added are fillers like limestone, chalk, graphite, talc, fly ash, quartz powder, glass fiber or cellulose fiber. The selection of filler and the amount of filler used in the polymer-modified asphalt composition depends on the intended use of the polymer-modified asphalt composition and is well known to the skilled worker.

Further examples of conventional additives may include anti-aging agents, corrosion inhibitors, biocides, pigments or processing aids, such as, for example, lubricants. The general amount is defined by both the application and the use of other polymers, including but not limited to S-polymers, and is well known to the skilled worker.

The preparation of the polymer-modified asphalt composition has no special limitations and is carried out in the manner known from the prior art. Usually, all components are intensively mixed in an agitated vessel at elevated temperatures of 175° C. to 195° C. The material obtained is then further processed depending on the intended use. The blend may be processed, for example by calendering or other suitable technologies such as coating, grinding, lubricating, spreading, laminating, extrusion etc.

The polymer-modified asphalt composition can be used for the production of asphalt sheets for waterproofing application, paving, sealing, drainage, roofing, etc.

Using water-dispersible polymer powder in place of or in conjunction with one of the S-polymers results in the advantages of a lower mix viscosity, higher softening point, improved tack, improved creep resistance, improved cold temperature flexibility, and better high temperature performance. Additionally, in the preparation of the polymer modified asphalt composition, the addition of water-dispersible polymer powder results in decreased processing temperatures and therefore decreased levels of additives and faster cooling due to lower viscosity.

EXAMPLES

Test Methods
Softening Point:
Softening point test (ASTM D36) is an empirical method to determine the consistency of penetration grade or oxidized asphalts. In this test two steel balls are placed on two discs of asphalt contained within metal rings placed in liquid (distilled water or glycerin) and the temperature is raised at a constant rate (5° C./min). The softening point is the temperature at which the bitumen softens enough to allow the balls enveloped in bitumen to fall a distance of 25 mm into the bottom plate. In short, this test measures a temperature at which the asphalt phase changes from semi-solid to liquid.
Viscosity:
Viscosity at elevated temperatures (ASTM D4402) is a standard that provides the apparent viscosity determined using a rotating spindle apparatus, by means of a coaxial viscometer. The control device (Brookfield programmable temperature controller) is set and allowed to equilibrate at the test temperature. The sample container (HT-2, internal diameter of 1.90 cm) is filled with the adequate volume of sample based on the size of the spindle used. The loaded container is placed in the controlled temperature environment device of the viscometer. The spindle (SC4-27, diameter of 1.18 cm, sample size ~10-12 g) connected to the rotating spindle viscometer is lowered into the sample, and the system temperature is allowed to equilibrate for 15 min. The rotating spindle viscometer is switched on and allowed to stabilize. Three readings are taken and recorded at 60 s intervals for each combination speed/temperature. The viscosity of the material is determined at two temperatures; 300° F. (149° C.) and 350° F. (177° C.).
Cone Penetration:
Cone penetration test (ASTM D217) is defined as the distance that a standard cone loaded with a 150 g weight will penetrate into an asphalt sample for 5 seconds. Usually penetration is measured at 25° C. The penetration grade is then labeled by the distance (≈0.1 mm), therefore smaller values indicate harder asphalt.
Flexibility:
Flexibility (ASTM D5329-09 section 18) of asphalt is measured by applying asphalt (1.57" (4 cm) thick) on a bright tin panel with a release agent. The sample is placed in a freezer. The testing temperatures generally used are 0° C., −4° C., −10° C., −16° C., −22° C., −28° C., and −34° C. For each temperature, the sample is equilibrated for 2 h, and then slowly bent over a 0.125" (0.3 cm) diameter mandrel at a 90° bend angle.
Flow:
Flow (ASTM D5329-09, section 8) of a sample of asphalt (1.57" (4 cm) thick) is measured by placing a small circular sample on a panel. The panel is placed in an oven at 60° C. for five hours at an angle of approximately 75±1°. After the testing time, the displacement of the sample is measured. A sample passes the resistance to creep test if it moves less than 3 mm.
Pull-Off Strength:
Pull-off strength (ASTM D4541-09) and adhesion is performed per ASTM D4541-09. In this method, a thin layer of hot asphalt (~less than 50 mils (1.27 mm) thick) is placed on a clean cement block. The stainless steel anchors are immediately placed on the applied sample of asphalt and allowed to cool for 24 hours. The adhesion or pull-off force is measured by an adhesion tester or Elcometer at a constant rate.

Example 1

A PG 58-28 asphalt was used and modified with polymer, wherein the total polymer modification was 10% by weight, based on the total weight of the polymer-modified asphalt composition (Table 3). The VAE polymer powder was used in combination with a standard radial SBS (tradename, Solprene 411), wherein the radial SBS was used at 6% by weight (compositions A and Comparative Example B), based on the total weight of the polymer-modified asphalt. The remaining 4% by weight of the polymer was comprised of either the polymer powder (A)(polyvinyl alcohol stabilized vinyl acetate/ethylene copolymer with Tg=−7° C., ETONIS® 850 of Wacker Chemie AG) or SBR (B) (tradename, Dynasol 1205). Example C and Comparative Example D were prepared similarly, but with different amounts of polymers. The properties, such as viscosity, softening point, flow, cone penetration, adhesion and low temperature flexibility were evaluated per ASTM test methods described above, and properties of the inventive polymer powder modified blends were compared to the SBS/SBR combination (Comp=comparison examples) (Table 4).

TABLE 3

Asphalt Blends of Example 1

Composition of Asphalt Blends

| Sample | Asphalt | ETONIS® 850 | SBR | $SBS_{rad}$ | Total polymer | Total |
|---|---|---|---|---|---|---|
| Asphalt | 100.0% | 0.0% | 0.0% | 0.0% | 0% | 100% |
| A | 90.0% | 4.0% | 0.0% | 6.0% | 10% | 100% |
| B (Comp) | 90.0% | 0.0% | 4.0% | 6.0% | 10% | 100% |
| C | 90.0% | 3.0% | 0.0% | 7.0% | 10% | 100% |
| D (Comp) | 90.0% | 0.0% | 3.0% | 7.0% | 10% | 100% |

TABLE 4

Properties of Asphalt Blends of Example 1
Properties of Asphalt Blends

| | Viscosity (S27) | | | Cone | Softening | Softening | Pull-off Strength ($N/mm^2$) | |
|---|---|---|---|---|---|---|---|---|
| Sample | 300° F. (149° C.) | 350° F. (177° C.) | Flow (60° C.) | Penetration (1/10 mm) | point (° C.) | point (° F.) | Avg. | Type of failure |
| Asphalt | 62 | — | Fail | 167.0 | 29 | 84 | 0.193 | Cohesive |
| A | 1286 | 316 | Pass | 142.7 | 107 | 225 | 0.355 | Adhesive |
| B (Comp) | 3350 | 1049 | Pass | 130.9 | 104 | 220 | 0.292 | Adhesive |
| C | 3047 | 482 | Pass | 126.7 | 107 | 224 | 0.241 | Adhesive |
| D (Comp) | 6246 | 968.2 | Pass | 111.0 | 106 | 223 | 0.076 | Adhesive |

The comparison in table 4 (inventive sample A with comparison sample B or inventive sample C with comparison sample D) show a much lower viscosity at processing temperatures if the S-polymers are partially substituted with water-dispersible polymer. The pull-off strength of the asphalt is also strikingly increased with the inventive way of modification.

Comparing A (SBS+VAE system) to neat asphalt, the penetration values are closer to the desired neat asphalt. Comparing B (SBS+SBR system) to A (SBS+VAI system), the VAE system is closer to the neat asphalt than B, which is much farther apart from neat asphalt. A lower penetration value implies a higher susceptibility to cracking.

Example 2

A PG 58-28 asphalt was used and modified with polymer powder, wherein the total polymer modification was 5% by weight, based on the total weight of the polymer-modified asphalt composition (Table 5). The VAE polymer powder was used in combination with a standard radial SBS (tradename, Solprene 411), wherein the radial SBS was used at 3% by weight (compositions E and F), based on the total weight of the polymer-modified asphalt. The rest of the 2% by weight of the polymer was comprised of either the polymer powder (E) (polyvinyl alcohol stabilized vinyl acetate/ethylene copolymer with Tg=−7° C., Etonis® 850 of Wacker Chemie AG) or SBR (F) (tradename Dynasol 1205). The properties, such as, viscosity, softening point, flow, cone penetration, adhesion and low temperature flexibility was evaluated per ASTM test methods described above and properties of the inventive polymer powder modified blends were compared to the SBS/SBR combination (Comp=comparison examples) (Table 6).

TABLE 5

Asphalt Blends of Example 2

Asphalt blends

| Sample | Asphalt | ETONIS® 850 | SBR | $SBS_{rad}$ | Total polymer | Total |
|---|---|---|---|---|---|---|
| Asphalt | 100.0% | 0.0% | 0.0% | 0.0% | 0% | 100% |
| E | 95.0% | 2.0% | 0.0% | 3.0% | 5% | 100% |
| F (Comp) | 95.0% | 0.0% | 2.0% | 3.0% | 5% | 100% |

TABLE 6

Properties of Asphalt Blends of Example 2

| Sample | Viscosity (S27) 300° F. (149° C.) | Viscosity (S27) 350° F. (177° C.) | Cone Penetration (1/10 mm) | Softening point (° C.) | Softening point (° F.) | Pull-off Strength (N/mm²) Avg. | Type of failure |
|---|---|---|---|---|---|---|---|
| Asphalt | 62 | — | 167 | 29 | 84 | 0.193 | Cohesive |
| E | 965 | — | 201 | 56 | 132 | 0.311 | Cohesive |
| F | 2156 | — | 188 | 64 | 147 | 0.361 | Cohesive |

The comparison in table 6 (inventive sample E with comparison sample F) show a much lower viscosity at a processing temperature of 300° F. if the S-polymer is partially substituted with water-dispersible polymer.

Referring to Table 6, the penetration value of E is higher than asphalt, which implies that it is softer and less susceptible to cracking Although the penetration value of E is higher, the softening point is higher than neat asphalt, which is a surprising result that is seen with the incorporation of the claimed VAE copolymers in an asphalt system. When comparing E to F, the benefits should be related to the application itself, for example, paving application in different climates, where different softness/hardness of asphalt, cracking and rutting susceptibility are required. In some applications, the properties of E are more preferable and in other applications F may be preferable.

The pull off strength is also influenced when F is compared to neat asphalt. When comparing properties to neat asphalt and E, it is imperative to look at the combination of properties (of F) versus absolute properties.

Example 3

A PG 58-28 asphalt was used and modified with polymer powder, wherein the total polymer modification was 5% by weight, based on the total weight of the polymer-modified asphalt composition (Table 7). The VAE polymer was used in combination with a standard radial SBS (tradename, Solprene 411), wherein the radial SBS was used at 3.5% by weight (compositions E and F), based on the total weight of the polymer-modified asphalt. The rest of the 1.5% by weight of the polymer was comprised of either the polymer powder (G) (polyvinyl alcohol stabilized vinyl acetate/ethylene copolymer with Tg=−7° C., Etonis® 850 of Wacker Chemie AG) or SBR (H) (tradename, Dynasol 1205). The properties, such as, viscosity, softening point, flow, cone penetration, adhesion and low temperature flexibility were evaluated per ASTM test methods described above, and properties of the inventive polymer powder modified compositions were compared to the SBS/SBR combinations (Table 8).

TABLE 7

Asphalt Blends of Example 2

| | Asphalt blends | | | | | |
|---|---|---|---|---|---|---|
| Sample | Asphalt | ETONIS® 850 | SBR | SBS$_{rad}$ | Total polymer | Total |
| Asphalt | 100.0% | 0.0% | 0.0% | 0.0% | 0% | 100% |
| G | 95.0% | 1.5% | 0.0% | 3.5% | 5% | 100% |
| H (comp) | 95.0% | 0.0% | 1.5% | 3.5% | 5% | 100% |

TABLE 8

Properties of Asphalt Blends of Example 3

| Sample | Viscosity (S27) 300° F. (149° C.) | Viscosity (S27) 350° F. (177° C.) | Flow 60° C. | Cone Penetration (1/10 mm) | Softening point (° C.) | Softening point (° F.) | Pull-off Strength (N/mm²) Avg. | Type of failure |
|---|---|---|---|---|---|---|---|---|
| Asphalt | 62 | — | Fail | 167 | 29 | 84 | 0.193 | Cohesive |
| G | 384 | — | Fail | 152 | 59 | 138 | 0.314 | Cohesive |
| H | 545 | — | Fail | 192 | 65 | 149 | 0.352 | Cohesive |

The comparison in table 6 (inventive sample G with comparison sample H) show still a much lower viscosity at a processing temperature of 300° F. if the S-polymer is partially substituted with water-dispersible polymer.

Comparing G (SBS+VAE system) to neat asphalt, the penetration values are closer to the desired neat asphalt. But, comparing H (SBS+SBR system) with G (SBS+VAE system), the VAE system is closer to the neat asphalt than H, which is much farther apart. A lower penetration value implies a higher susceptibility to cracking.

Comparing G to neat asphalt, the pull-off strength is higher. When comparing properties to neat asphalt and H, it is the combination of properties (of G) versus absolute properties which must be considered.

Studies of low temperature flexibility show that the incorporation of polymer powder in the asphalt formulation produces compositions with comparable properties to that of an S-polymer system.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A non-aqueous polymer modified asphalt composition comprising a blend of non-aqueous asphalt with a vinyl acetate/ethylene copolymer composition having a vinyl acetate content of more than 55% by weight based on the polymer content of the copolymer composition, and optionally also comprising an S-polymer, wherein the ethylene content of the vinyl acetate/ethylene copolymer is 40 wt. % or less based on the polymer content of the copolymer composition, and wherein the vinyl acetate/ethylene copolymer composition is in the form of a water-redispersible powder prior to blending with non-aqueous asphalt to form the blend.

2. The polymer modified asphalt of claim 1, wherein the vinyl acetate/ethylene copolymer composition is present in an amount of from 1 to 40 weight percent based on the weight of the polymer modified asphalt composition.

3. The polymer modified asphalt composition of claim 1, wherein at least one S-polymer or GTR is contained in the blend.

4. The polymer modified asphalt composition of claim 1, further comprising one or more additives selected from anti-aging agents, extenders, processing aids, naphthenic oils, paraffinic oils, waxes, fillers, tackifiers, rosin esters, acids, solvents, and/or reinforcing fibers.

5. The polymer modified asphalt composition of claim 1, wherein the vinyl acetate/ethylene copolymer further comprises moieties derived from one or more of vinyl esters of $C_{3-15}$ acids, (meth)acrylate esters of $C_{1-15}$ alcohols, vinyl chloride, butadiene, isoprene and/or styrene.

6. The polymer modified asphalt composition of claim 1, further comprising moieties derived from ethylenically unsaturated monocarboxylic and dicarboxylic acids, ethylenically unsaturated carboxamides and carbonitriles, maleic anhydride, ethylenically unsaturated sulfonic acids and their salts, polyethylenically unsaturated comonomers of N-methylolacrylamide (NMA), N-methylolmethacrylamide (NMMA), and optionally epoxide-functional comonomers, and silicone functional comonomers.

7. The polymer modified asphalt of claim 1, wherein the vinyl acetate/ethylene copolymer composition is present in an amount of from 1 to 30 weight percent based on the weight of the polymer modified asphalt composition.

8. The polymer modified asphalt of claim 3, wherein the weight ratio of S-polymer to vinyl acetate/ethylene copolymer is less than 2:1.

9. The polymer-modified asphalt of claim 1, wherein the total polymer content of the polymer modified asphalt is from 1 to 15 weight percent based on the total weight of the polymer-modified asphalt composition.

10. A process for the preparation of the polymer modified asphalt composition of claim 1, wherein the blend is prepared by blending the vinyl acetate/ethylene copolymer, non-aqueous asphalt, and any further components at a temperature above the softening point of the asphalt.

11. The process of claim 10, wherein blending is performed at a temperature of from 175° C. to 195° C.

12. The process of claim 10, wherein an S-polymer is further blended with the non-aqueous asphalt.

13. A non-aqueous polymer modified asphalt composition consisting of a blend of non-aqueous asphalt with a vinyl acetate/ethylene copolymer composition having a vinyl acetate content of more than 55% by weight based on the polymer content of the copolymer composition, and optionally also comprising an S-polymer, wherein the ethylene content of the vinyl acetate/ethylene copolymer is 40 wt. % or less based on the polymer content of the copolymer composition, and wherein the vinyl acetate/ethylene copolymer composition is in the form of a water-redispersible powder prior to blending with non-aqueous asphalt to form the blend, optionally, one or more additives selected from anti-aging agents, extenders, processing aids, naphthenic oils, paraffinic oils, waxes, fillers, tackifiers, rosin esters, acids, solvents, and/or reinforcing fibers, optionally, wherein the vinyl acetate/ethylene copolymer further contains moieties derived from one or more of vinyl esters of $C_{3-15}$ acids, (meth)acrylate esters of $C_{1-15}$ alcohols, vinyl chloride, butadiene, isoprene and/or styrene, optionally, wherein the vinyl acetate/ethylene polymer further contains moieties derived from ethylenically unsaturated monocarboxylic and dicarboxylic acids, ethylenically unsaturated carboxamides and carbonitriles, maleic anhydride, ethylenically unsaturated sulfonic acids and their salts, polyethylenically unsaturated comonomers of N-methylolacrylamide (NMA), N-methylolmethacrylamide (NMMA), and optionally epoxide-functional comonomers, and silicone functional comonomers.

* * * * *